(12) United States Patent
Yu

(10) Patent No.: US 10,091,672 B2
(45) Date of Patent: Oct. 2, 2018

(54) FAULT HANDLING METHOD, APPARATUS AND SYSTEM

(71) Applicant: Huawei Technologies Co., Ltd., Shenzhen, Guangdong (CN)

(72) Inventor: Ming Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 275 days.

(21) Appl. No.: 14/979,383

(22) Filed: Dec. 27, 2015

(65) Prior Publication Data

US 2016/0135065 A1     May 12, 2016

Related U.S. Application Data

(63) Continuation of application No. PCT/CN2013/078135, filed on Jun. 27, 2013.

(51) Int. Cl.
| | |
|---|---|
| *H04W 24/04* | (2009.01) |
| *H04L 29/14* | (2006.01) |
| *H04L 12/24* | (2006.01) |
| *H04W 8/30* | (2009.01) |

(52) U.S. Cl.
CPC ............ *H04W 24/04* (2013.01); *H04L 29/14* (2013.01); *H04L 41/0604* (2013.01); *H04L 41/065* (2013.01); *H04L 41/0654* (2013.01); *H04L 69/40* (2013.01); *H04W 8/30* (2013.01)

(58) Field of Classification Search
CPC ...... H04W 24/04; H04W 8/30; H04L 41/065; H04L 41/0604; H04L 69/40; H04L 41/0654; H04L 29/14
See application file for complete search history.

(56) References Cited

U.S. PATENT DOCUMENTS

| | | | | |
|---|---|---|---|---|
| 5,768,501 A | * | 6/1998 | Lewis ................... | H04L 41/044 714/25 |
| 6,253,339 B1 | * | 6/2001 | Tse ....................... | H04Q 3/0075 370/216 |

(Continued)

FOREIGN PATENT DOCUMENTS

| | | |
|---|---|---|
| CN | 101039498 A | 9/2007 |
| CN | 101159617 A | 4/2008 |

(Continued)

*Primary Examiner* — Edan Orgad
*Assistant Examiner* — Ivan O Latorre

(57) ABSTRACT

Embodiments of the present invention provide a fault handling method, apparatus and system, and relate to the field of communications, where the method includes: detecting, by a lower-layer fault management system, a fault alarm status in a lower-layer service; obtaining, by means of query by the lower-layer fault management system, according to the fault alarm status and a service dependence relationship table stored in a system, an affected higher-layer service; sending, by the lower-layer fault management system, a fault notification message to a higher-layer fault management system corresponding to the affected higher-layer service; and determining, by the higher-layer fault management system, according to the fault notification message whether a higher-layer service in which a fault occurs needs to be handled.

12 Claims, 6 Drawing Sheets

(56) References Cited

U.S. PATENT DOCUMENTS

| | | | | |
|---|---|---|---|---|
| 7,237,138 B2* | 6/2007 | Greenwald | ......... | G06F 11/2257 714/4.3 |
| 7,830,784 B2* | 11/2010 | Pitchforth, Jr. | ..... | H04L 41/0659 370/216 |
| 8,406,134 B2* | 3/2013 | Medina | ................. | H04L 1/0009 370/231 |
| 2002/0010770 A1 | 1/2002 | Ueno | .................... | H04L 41/044 709/223 |
| 2002/0171886 A1* | 11/2002 | Wu | ........................ | H04L 45/02 398/20 |
| 2003/0216141 A1* | 11/2003 | Antoniou | ................ | H04L 45/22 455/450 |
| 2005/0013241 A1* | 1/2005 | Beller | ..................... | H04J 3/085 370/216 |
| 2005/0063299 A1* | 3/2005 | Atkinson | ............ | H04J 14/0227 370/216 |
| 2007/0014233 A1* | 1/2007 | Oguro | ................. | H04L 41/0631 370/216 |
| 2007/0177523 A1* | 8/2007 | Nagami | .............. | H04L 41/0631 370/252 |
| 2008/0304416 A1* | 12/2008 | Fodor | ..................... | H04L 47/10 370/237 |
| 2009/0003211 A1* | 1/2009 | Akyamac | ............ | H04J 14/0284 370/235 |
| 2010/0036939 A1 | 2/2010 | Yang et al. | | |
| 2010/0281295 A1* | 11/2010 | Karandikar | ......... | H04L 41/0663 714/4.1 |
| 2011/0178977 A1 | 7/2011 | Drees | | |
| 2012/0147750 A1* | 6/2012 | Pelletier | .................. | H04L 47/12 370/235 |
| 2013/0159510 A1* | 6/2013 | Cahill | ..................... | H04L 69/28 709/224 |
| 2015/0029887 A1* | 1/2015 | Briscoe | ................. | H04L 47/326 370/252 |
| 2016/0105912 A1* | 4/2016 | Stattin | .................... | H04W 74/08 370/216 |

FOREIGN PATENT DOCUMENTS

| | | |
|---|---|---|
| CN | 101335643 A | 12/2008 |
| CN | 101800675 A | 8/2010 |
| CN | 101860802 A | 10/2010 |
| CN | 101917288 A | 12/2010 |
| CN | 102238144 A | 11/2011 |
| WO | WO 2010/074630 A1 | 7/2010 |
| WO | 2011159868 A2 | 12/2011 |

* cited by examiner

FAULT HANDLING METHOD, APPARATUS AND SYSTEM

CROSS-REFERENCE TO RELATED APPLICATIONS

This application is a continuation of International Application No. PCT/CN2013/078135, filed on Jun. 27, 2013, which is hereby incorporated by reference in its entirety.

TECHNICAL FIELD

The present invention relates to the field of communications, and in particular, to a fault handling method, apparatus and system.

BACKGROUND

A fault management system is one of important components in a mobile communications system, and mainly provides fault locating and fault handling for the mobile communications system.

Currently, different operators usually operate different mobile communications systems, and a specific mobile communications system is generally operated by a separate operator, and therefore a fault management system is also designed based on an architecture of an operator. Specifically, a mobile communications system generally includes an infrastructure component, a transmission component and a wireless service component, and because these components are all managed by a same operator, a fault management system is also applied to these components at the same time, and no matter whether it is fault locating or fault handling, both the fault locating and the fault handling are completed inside the operator. After the fault management system locates a fault, a corresponding dispatch work order is generated and sent to maintenance personnel of the operator.

However, with development of cloud computing technologies, a same mobile communications system is gradually managed by multiple operators by means of subdivision. That is, different components in the mobile communications system may be operated by different operators. In this case, when the fault management system detects a service fault, a fault alarm may need to be sent to different operators, but an actual fault reason may occur only in a component operated by an operator, which wastes manpower or material resources of other operators during fault maintenance.

SUMMARY

To resolve a problem that in a scenario in which different operators operate a same mobile communications system at the same time, an existing fault management system may cause some operators to waste manpower or material resources during fault maintenance, embodiments of the present invention provide a fault handling method, apparatus and system. The technical solutions are as follows:

According to a first aspect, a fault handling method is provided, and used for a lower-layer fault management system in a communication fault management system, where the communication fault management system includes at least one lower-layer fault management system and at least one higher-layer fault management system, and the method includes:

detecting a fault alarm status in a lower-layer service;

obtaining, by means of query according to the fault alarm status and a service dependence relationship table stored in a system, an affected higher-layer service; and sending a fault notification message to the higher-layer fault management system corresponding to the affected higher-layer service, so that the higher-layer fault management system receives the fault notification message sent by the lower-layer fault management system, and determines, according to the fault notification message, whether a higher-layer service in which a fault occurs needs to be handled, where the service dependence relationship table is a correspondence between a lower-layer service and a higher-layer service running in dependence on the lower-layer service.

In a first possible implementation manner of the first aspect, if the fault alarm status is that a fault occurs in a lower-layer service, the sending a fault notification message to the higher-layer fault management system corresponding to the affected higher-layer service includes:

sending a fault generation message to the higher-layer fault management system corresponding to the affected higher-layer service, where the fault generation message carries a higher-layer affected-service identifier, and the higher-layer affected-service identifier is used for indicating a higher-layer service affected by a lower-layer service in which a fault alarm occurs, so that the higher-layer fault management system receives and saves the fault generation message sent by the lower-layer fault management system; detects, in a period during which the fault generation message is saved, whether a fault occurs in the higher-layer service indicated by the higher-layer affected-service identifier carried in the fault generation message; and if a result of the detecting is that a fault occurs, pends handling of the fault of the higher-layer service.

With reference to the first possible implementation manner of the first aspect, in a second possible implementation manner, it is characterized in that, if the fault alarm status is that a fault of a lower-layer service is already restored, the sending a fault notification message to the higher-layer fault management system corresponding to the affected higher-layer service includes:

sending a fault restoration message to the higher-layer fault management system corresponding to the affected higher-layer service, where the fault restoration message carries a higher-layer affected-service identifier, and the higher-layer affected-service identifier is used for indicating a higher-layer service affected by a lower-layer service in which a fault alarm occurs, so that the higher-layer fault management system receives the fault restoration message sent by the lower-layer fault management system; detects whether a fault of the higher-layer service indicated by the higher-layer affected-service identifier carried in the fault restoration message is already restored; and if a result of the detecting is that the fault is not restored yet, handles the fault of the higher-layer service.

With reference to the second possible implementation manner of the first aspect, in a third possible implementation manner, both the fault generation message and the fault restoration message further carry a lower-layer service fault identifier and a fault type, and the lower-layer service fault identifier is used for indicating the lower-layer service in which a fault alarm occurs, so that the higher-layer fault management system searches for a fault generation message matching the fault restoration message, where the matching refers to that the two messages include the same lower-layer service fault identifier and the same fault type; and when the fault generation message matching the fault restoration message is found, deletes the fault generation message.

According to a second aspect, a fault handling method is provided, and used for a higher-layer fault management system in a communication fault management system, where the communication fault management system includes at least one lower-layer fault management system and at least one higher-layer fault management system, and the method includes:

receiving a fault notification message sent by the lower-layer fault management system, where the lower-layer fault management system detects a fault alarm status in a lower-layer service, obtains, by means of query according to the fault alarm status and a service dependence relationship table stored in a system, an affected higher-layer service, and then sends the fault notification message to the higher-layer fault management system corresponding to the affected higher-layer service; and determining, according to the fault notification message, whether a higher-layer service in which a fault occurs needs to be handled, where the service dependence relationship table is a correspondence between a lower-layer service and a higher-layer service running in dependence on the lower-layer service.

In a first possible implementation manner of the second aspect, the receiving a fault notification message sent by the lower-layer fault management system includes:

receiving and saving a fault generation message sent by the lower-layer fault management system, where the fault generation message carries a higher-layer affected-service identifier, and the higher-layer affected-service identifier is used for indicating a higher-layer service affected by a lower-layer service in which a fault alarm occurs; and the determining, according to the fault notification message, whether a higher-layer service in which a fault occurs needs to be handled includes:

detecting, in a period during which the fault generation message is saved, whether a fault occurs in the higher-layer service indicated by the higher-layer affected-service identifier carried in the fault generation message; and if a result of the detecting is that a fault occurs, pending handling of the fault of the higher-layer service.

With reference to the first possible implementation manner of the second aspect, in a second possible implementation manner, the detecting, in a period during which the fault generation message is saved, whether a fault occurs in the higher-layer service indicated by the higher-layer affected-service identifier carried in the fault generation message includes:

after the fault generation message is received, detecting whether the higher-layer affected-service identifier carried in the fault generation message is the same as any one of at least one currently saved higher-layer fault service identifier, where the higher-layer fault service identifier is used for indicating a higher-layer service in which a fault occurs; and if a result of the detecting is that the received higher-layer affected-service identifier is the same as a currently saved higher-layer fault service identifier, determining that a fault occurs in the higher-layer service indicated by the higher-layer affected-service identifier carried in the fault generation message.

With reference to the first possible implementation manner of the second aspect, in a third possible implementation manner, the detecting, in a period during which the fault generation message is saved, whether a fault occurs in the higher-layer service indicated by the higher-layer affected-service identifier carried in the fault generation message includes:

after it is detected that a fault occurs in a higher-layer service, obtaining a corresponding higher-layer fault service identifier, where the higher-layer fault service identifier is used for indicating a higher-layer service in which a fault occurs;

detecting whether the obtained higher-layer fault service identifier is the same as any one of the at least one currently saved higher-layer affected-service identifier; and if a result of the detecting is that the obtained higher-layer fault service identifier is the same as a currently saved higher-layer affected-service identifier, determining that a fault occurs in a higher-layer service indicated by the same higher-layer affected-service identifier carried in the fault generation message.

With reference to the third possible implementation manner of the second aspect, in a fourth possible implementation manner, after detecting whether the obtained higher-layer fault service identifier is the same as any one of the at least one pre-saved higher-layer affected-service identifier, the method further includes:

if a result of the detecting is that the obtained higher-layer fault service identifier is different from all currently saved higher-layer affected-service identifiers, handling the fault of the higher-layer service indicated by the obtained higher-layer fault service identifier.

With reference to the first, the second, the third and the fourth possible implementation manners of the second aspect, in a fifth possible implementation manner, the receiving a fault notification message sent by the lower-layer fault management system includes:

receiving a fault restoration message sent by the lower-layer fault management system, where the fault restoration message carries the higher-layer affected-service identifier; and the determining, according to the fault notification message, whether a higher-layer service in which a fault occurs needs to be handled includes:

detecting whether a fault of the higher-layer service indicated by the higher-layer affected-service identifier carried in the fault restoration message is already restored; and if a result of the detecting is that the fault is not restored yet, handling the fault of the higher-layer service.

With reference to the fifth possible implementation manner of the second aspect, in a sixth possible implementation manner, both the fault generation message and the fault restoration message further carry a lower-layer service fault identifier and a fault type, and the lower-layer service fault identifier is used for indicating the lower-layer service in which a fault alarm occurs, after the receiving a fault restoration message sent by the lower-layer fault management system, the method further includes:

searching for a fault generation message matching the fault restoration message, where the matching refers to that the two messages include the same lower-layer service fault identifier and the same fault type; and when the fault generation message matching the fault restoration message is found, deleting the fault generation message.

According to a third aspect, a fault handling apparatus is provided, and used for a lower-layer fault management system in a communication fault management system, where the communication fault management system includes at least one lower-layer fault management system and at least one higher-layer fault management system, and the apparatus includes:

an alarm detection module, configured to detect a fault alarm status in a lower-layer service;

a relationship query module, configured to obtain, by means of query according to the fault alarm status and a service dependence relationship table stored in a system, an affected higher-layer service; and a message sending module, configured to send a fault notification message to the higher-layer fault management system corresponding to the affected higher-layer service, so that the higher-layer fault management system receives the fault notification message sent by the lower-layer fault management system, and determines, according to the fault notification message, whether a higher-layer service in which a fault occurs needs to be handled, where the service dependence relationship table is a correspondence between a lower-layer service and a higher-layer service running in dependence on the lower-layer service.

In a first possible implementation manner of the third aspect, if the fault alarm status is that a fault occurs in a lower-layer service, the message sending module is configured to send a fault generation message to the higher-layer fault management system corresponding to the affected higher-layer service, where the fault generation message carries a higher-layer affected-service identifier, and the higher-layer affected-service identifier is used for indicating a higher-layer service affected by a lower-layer service in which a fault alarm occurs, so that the higher-layer fault management system receives and saves the fault generation message sent by the lower-layer fault management system; detects, in a period during which the fault generation message is saved, whether a fault occurs in the higher-layer service indicated by the higher-layer affected-service identifier carried in the fault generation message; and if a result of the detecting is that a fault occurs, pends handling of the fault of the higher-layer service.

With reference to the second possible implementation manner of the third aspect, in a third possible implementation manner, if the fault alarm status is that a fault of a lower-layer service is already restored, the message sending module is configured to send a fault restoration message to the higher-layer fault management system corresponding to the affected higher-layer service, where the fault restoration message carries a higher-layer affected-service identifier, and the higher-layer affected-service identifier is used for indicating a higher-layer service affected by a lower-layer service in which a fault alarm occurs, so that the higher-layer fault management system receives the fault restoration message sent by the lower-layer fault management system; detects whether a fault of the higher-layer service indicated by the higher-layer affected-service identifier carried in the fault restoration message is already restored; and if a result of the detecting is that the fault is not restored yet, handles the fault of the higher-layer service.

With reference to the third possible implementation manner of the third aspect, in a fourth possible implementation manner, both the fault generation message and the fault restoration message further carry a lower-layer service fault identifier and a fault type, and the lower-layer service fault identifier is used for indicating the lower-layer service in which a fault alarm occurs, so that the higher-layer fault management system searches for a fault generation message matching the fault restoration message, where the matching refers to that the two messages include the same lower-layer service fault identifier and the same fault type; and when the fault generation message matching the fault restoration message is found, deletes the fault generation message.

According to a fourth aspect, a fault handling apparatus is provided, and used for a higher-layer fault management system in a communication fault management system, where the communication fault management system includes at least one lower-layer fault management system and at least one higher-layer fault management system, and the apparatus includes:

a message receiving module, configured to receive a fault notification message sent by the lower-layer fault management system, where the lower-layer fault management system detects a fault alarm status in a lower-layer service, obtains, by means of query according to the fault alarm status and a service dependence relationship table stored in a system, an affected higher-layer service, and then sends the fault notification message to the higher-layer fault management system corresponding to the affected higher-layer service; and a fault handling module, configured to determine, according to the fault notification message, whether a higher-layer service in which a fault occurs needs to be handled, where the service dependence relationship table is a correspondence between a lower-layer service and a higher-layer service running in dependence on the lower-layer service.

In a first possible implementation manner of the fourth aspect, the message receiving module is configured to receive and save a fault generation message sent by the lower-layer fault management system, where the fault generation message carries a higher-layer affected-service identifier, and the higher-layer affected-service identifier is used for indicating a higher-layer service affected by a lower-layer service in which a fault alarm occurs; and the fault handling module is configured to detect, in a period during which the fault generation message is saved, whether a fault occurs in the higher-layer service indicated by the higher-layer affected-service identifier carried in the fault generation message; and if a result of the detecting is that a fault occurs, pend handling of the fault of the higher-layer service.

With reference to the first possible implementation manner of the fourth aspect, in a second possible implementation manner, the fault handling module includes a first detection unit and a first determining unit;

the first detection unit is configured to: after the fault generation message is received, detect whether the higher-layer affected-service identifier carried in the fault generation message is the same as any one of at least one currently saved higher-layer fault service identifier, where the higher-layer fault service identifier is used for indicating a higher-layer service in which a fault occurs; and the first determining unit is configured to: if a result of the detecting is that the received higher-layer affected-service identifier is the same as a currently saved higher-layer fault service identifier, determine that a fault occurs in the higher-layer service indicated by the higher-layer affected-service identifier carried in the fault generation message.

With reference to the first possible implementation manner of the fourth aspect, in a third possible implementation manner, the fault handling module includes an identifier obtaining unit, a second detection unit, and a second determining unit;

the identifier obtaining unit is configured to: after it is detected that a fault occurs in a higher-layer service, obtain a corresponding higher-layer fault service identifier, where the higher-layer fault service identifier is used for indicating a higher-layer service in which a fault occurs;

the second detection unit is configured to detect whether the obtained higher-layer fault service identifier is the same as any one of the at least one currently saved higher-layer affected-service identifier; and the second determining unit is configured to: if a result of the detecting is that the obtained higher-layer fault service identifier is the same as a currently saved higher-layer affected-service identifier, determine that a fault occurs in a higher-layer service indicated by the same higher-layer affected-service identifier carried in the fault generation message.

With reference to the third possible implementation manner of the fourth aspect, in a fourth possible implementation manner, the fault handling module further includes a third determining unit; and the third determining unit is configured to: if a result of the detecting is that the obtained higher-layer fault service identifier is different from all currently saved higher-layer affected-service identifiers, handle the fault of the higher-layer service indicated by the obtained higher-layer fault service identifier.

With reference to the first, the second, the third and the fourth possible implementation manners of the fourth aspect, in a fifth possible implementation manner, the message receiving module is further configured to receive a fault restoration message sent by the lower-layer fault management system, where the fault restoration message carries the higher-layer affected-service identifier; and the fault handling module is further configured to detect whether a fault of the higher-layer service indicated by the higher-layer affected-service identifier carried in the fault restoration message is already restored; and if a result of the detecting is that the fault is not restored yet, handle the fault of the higher-layer service.

With reference to the fifth possible implementation manner of the fourth aspect, in a sixth possible implementation manner, both the fault generation message and the fault restoration message further carry a lower-layer service fault identifier and a fault type, and the lower-layer service fault identifier is used for indicating the lower-layer service in which a fault alarm occurs, the apparatus further includes a message matching module and a message deletion module; where the message matching module is configured to search for a fault generation message matching the fault restoration message, where the matching refers to that the two messages include the same lower-layer service fault identifier and the same fault type; and the message deletion module is configured to: when the fault generation message matching the fault restoration message is found, delete the fault generation message.

According to a fifth aspect, a communication fault management system is provided, where the system includes at least one lower-layer fault management system and at least one higher-layer fault management system;

the lower-layer fault management system includes the fault handling apparatus according to any one of the third aspect and various possible implementation manners of the third aspect; and the higher-layer fault management system includes the fault handling apparatus according to any one of the fourth aspect and various possible implementation manners of the fourth aspect.

According to a sixth aspect, a fault management system is provided, and configured to be implemented as a lower-layer fault management system in a communication fault management system, where the communication fault management system includes at least one lower-layer fault management system and at least one higher-layer fault management system, and the system includes: a processor, a memory, and a sender;

the processor is configured to detect a fault alarm status in a lower-layer service;

the processor is further configured to obtain, by means of query according to the fault alarm status and a service dependence relationship table stored in a system in the memory, an affected higher-layer service; and the processor is further configured to control the sender to send a fault notification message to the higher-layer fault management system corresponding to the affected higher-layer service, so that the higher-layer fault management system receives the fault notification message sent by the lower-layer fault management system, and determines, according to the fault notification message, whether a higher-layer service in which a fault occurs needs to be handled, where the service dependence relationship table is a correspondence between a lower-layer service and a higher-layer service running in dependence on the lower-layer service.

In a first possible implementation manner of the sixth aspect, if the fault alarm status is that a fault occurs in a lower-layer service, the processor is further configured to control the sender to send a fault generation message to the higher-layer fault management system corresponding to the affected higher-layer service, where the fault generation message carries a higher-layer affected-service identifier, and the higher-layer affected-service identifier is used for indicating a higher-layer service affected by a lower-layer service in which a fault alarm occurs, so that the higher-layer fault management system receives and saves the fault generation message sent by the lower-layer fault management system; detects, in a period during which the fault generation message is saved, whether a fault occurs in the higher-layer service indicated by the higher-layer affected-service identifier carried in the fault generation message; and if a result of the detecting is that a fault occurs, pends handling of the fault of the higher-layer service.

With reference to the first possible implementation manner of the sixth aspect, in a second possible implementation manner, if the fault alarm status is that a fault of a lower-layer service is already restored, the processor is further configured to control the sender to send a fault restoration message to the higher-layer fault management system corresponding to the affected higher-layer service, where the fault restoration message carries a higher-layer affected-service identifier, and the higher-layer affected-service identifier is used for indicating a higher-layer service affected by a lower-layer service in which a fault alarm occurs, so that the higher-layer fault management system receives the fault restoration message sent by the lower-layer fault management system; detects whether a fault of the higher-layer service indicated by the higher-layer affected-service identifier carried in the fault restoration message is already restored; and if a result of the detecting is that the fault is not restored yet, handles the fault of the higher-layer service.

With reference to the second possible implementation manner of the sixth aspect, in a third possible implementation manner, both the fault generation message and the fault restoration message further carry a lower-layer service fault identifier and a fault type, and the lower-layer service fault identifier is used for indicating the lower-layer service in which a fault alarm occurs, so that the higher-layer fault management system searches for a fault generation message matching the fault restoration message, where the matching refers to that the two messages include the same lower-layer service fault identifier and the same fault type; and when the fault generation message matching the fault restoration message is found, deletes the fault generation message.

According to a seventh aspect, a fault handling system is provided, and configured to be implemented as a higher-layer fault management system in a communication fault management system, where the communication fault management system includes at least one lower-layer fault management system and at least one higher-layer fault management system, and the system includes: a receiver, a processor, and a memory;

the processor is configured to control the receiver to receive a fault notification message sent by the lower-layer fault management system, where the lower-layer fault management system detects a fault alarm status in a lower-layer service, obtains, by means of query according to the fault alarm status and a service dependence relationship table stored in a system, an affected higher-layer service, and then sends the fault notification message to the higher-layer fault management system corresponding to the affected higher-layer service; and the processor is further configured to determine, according to the fault notification message, whether a higher-layer service in which a fault occurs needs to be handled, where the service dependence relationship table is a correspondence between a lower-layer service and a higher-layer service running in dependence on the lower-layer service.

In a first possible implementation manner of the seventh aspect, the processor is further configured to control the receiver to receive a fault generation message sent by the lower-layer fault management system, and save the fault generation message into the memory, where the fault generation message carries a higher-layer affected-service identifier, and the higher-layer affected-service identifier is used for indicating a higher-layer service affected by a lower-layer service in which a fault alarm occurs;

the processor is further configured to detect, in a period during which the memory saves the fault generation message, whether a fault occurs in the higher-layer service indicated by the higher-layer affected-service identifier carried in the fault generation message; and the processor is further configured to: if a result of the detecting is that a fault occurs, pend handling of the fault of the higher-layer service.

With reference to the first possible implementation manner of the seventh aspect, in a second possible implementation manner, the processor is further configured to: after the receiver is controlled to receive the fault generation message, detect whether the higher-layer affected-service identifier carried in the fault generation message is the same as anyone of at least one higher-layer fault service identifier currently saved in the memory, where the higher-layer fault service identifier is used for indicating a higher-layer service in which a fault occurs; and the processor is further configured to: if a result of the detecting is that the received higher-layer affected-service identifier is the same as a currently saved higher-layer fault service identifier, determine that a fault occurs in the higher-layer service indicated by the higher-layer affected-service identifier carried in the fault generation message.

With reference to the first possible implementation manner of the seventh aspect, in a third possible implementation manner, the processor is further configured to: after it is detected that a fault occurs in a higher-layer service, obtain a corresponding higher-layer fault service identifier, where the higher-layer fault service identifier is used for indicating a higher-layer service in which a fault occurs;

the processor is further configured to detect whether the obtained higher-layer fault service identifier is the same as any one of the at least one higher-layer affected-service identifier currently saved in the memory; and the processor is further configured to: if a result of the detecting is that the obtained higher-layer fault service identifier is the same as a currently saved higher-layer affected-service identifier, determine that a fault occurs in a higher-layer service indicated by the same higher-layer affected-service identifier carried in the fault generation message.

With reference to the third possible implementation manner of the seventh aspect, in a fourth possible implementation manner, the processor is further configured to: if a result of the detecting is that the obtained higher-layer fault service identifier is different from all currently saved higher-layer affected-service identifiers, handle the fault of the higher-layer service indicated by the obtained higher-layer fault service identifier.

With reference to the first, the second, the third and the fourth possible implementation manners of the seventh aspect, in a fifth possible implementation manner, the processor is further configured to control the receiver to receive a fault restoration message sent by the lower-layer fault management system, where the fault restoration message carries the higher-layer affected-service identifier;

the processor is further configured to detect whether a fault of the higher-layer service indicated by the higher-layer affected-service identifier carried in the fault restoration message is already restored; and the processor is further configured to: if a result of the detecting is that the fault is not restored yet, handle the fault of the higher-layer service.

With reference to the fifth possible implementation manner of the seventh aspect, in a sixth possible implementation manner, both the fault generation message and the fault restoration message further carry a lower-layer service fault identifier and a fault type, and the lower-layer service fault identifier is used for indicating the lower-layer service in which a fault alarm occurs;

the processor is further configured to search for a fault generation message matching the fault restoration message, where the matching refers to that the two messages include the same lower-layer service fault identifier and the same fault type; and the processor is further configured to: when the fault generation message matching the fault restoration message is found, delete the fault generation message.

According to an eighth aspect, a communication fault management system is provided, where the system includes at least one lower-layer fault management system and at least one higher-layer fault management system;

the lower-layer fault management system is the fault management system according to anyone of the sixth aspect and various possible implementation manners of the sixth aspect; and the higher-layer fault management system is the fault management system according to any one of the seventh aspect and various possible implementation manners of the seventh aspect.

Beneficial effects of the technical solutions provided in the embodiments of the present invention are as follows:

At least two fault management systems are arranged, and when a fault alarm status of a lower-layer service is detected, a lower-layer fault management system obtains, by means of query according to the fault alarm status and a service dependence relationship table stored in a system, an affected higher-layer service; and sends a fault notification message to a higher-layer fault management system corresponding to the affected higher-layer service, so that the higher-layer fault management system determines, according to the fault notification message, whether a higher-layer service in which a fault occurs needs to be handled, which resolves a problem that in a scenario in which different operators operate a same mobile communications system at the same time, an existing fault management system may cause some operators to waste manpower or material resources during fault maintenance; and achieves an effect that when a fault occurs in the lower-layer service, the higher-layer fault management system may determine for the higher-layer service in which the fault occurs, according to the fault notification message, whether the higher-layer service in which the fault occurs needs to be handled, thereby reducing unnecessary waste of maintenance resources.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3A-1 and FIG. 3A-2 are a method flowchart of a fault handling method according to another embodiment of the present invention;

DETAILED DESCRIPTION

To make the objectives, technical solutions, and advantages of the present invention clearer, the following further describes the embodiments of the present invention in detail with reference to the accompanying drawings.

Figure 1:
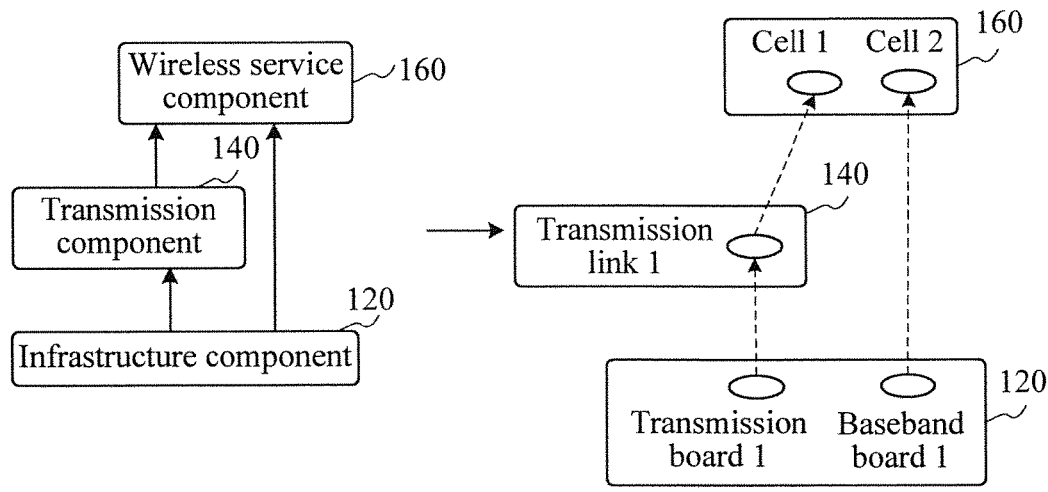
FIG. 1 is a schematic structural diagram of an implementation environment involved in an embodiment of the present invention.

Referring to FIG. 1, FIG. 1 shows a schematic structural diagram of an implementation environment involved in an embodiment of the present invention. The implementation environment is a mobile communications system, and the mobile communications system includes an infrastructure component 120, a transmission component 140, and a wireless service component 160.

A hierarchy relationship exists between different components, and therefore an interaction and interdependence relationship exists on service bearing. Specifically:

The wireless service component 160 is located on the highest layer, and therefore proper running of a service on the wireless service component 160 depends on proper running of a service on the transmission component 140 or a service on the infrastructure component 120. For example, it is assumed that services provided on the wireless service component 160 include a cell 1 and a cell 2, services provided on the transmission component 140 include a transmission link 1, and services provided on the infrastructure component 120 include a transmission board 1 and a baseband board 1. Proper running of the cell 1 depends on proper running of the transmission link 1 and the transmission board 1; proper running of the cell 2 depends on proper running of the baseband board 1.

The transmission component 140 is located on an upper layer of the infrastructure component 120, and therefore proper running of the services on the transmission component 140 depends on proper running of the services on the infrastructure component 120. For example, proper running of the transmission link 1 depends on proper running of the transmission board 1. Such correspondence in which proper running of a higher-layer service needs to depend on proper running of a lower-layer service may be referred to as a service dependence relationship.

When different components in the mobile communications system are operated by different operators, different fault management systems may be separately arranged for different operators. Corresponding to a hierarchy relationship between the different components, the fault management systems corresponding to the components are also divided into multiple layers. In every two layers of fault management systems, a fault management system located on a lower layer is referred to as a lower-layer fault management system, and a fault management system located on an upper layer is referred to as a higher-layer fault management system. For example, between the wireless service component 160 and the transmission component 140, a fault management system corresponding to the wireless service component 160 is a higher-layer fault management system, and a fault management system corresponding to the transmission component 140 is a lower-layer fault management system; for another example, between the transmission component 140 and the infrastructure component 120, a fault management system corresponding to the transmission component 140 is a higher-layer fault management system, and a fault management system corresponding to the infrastructure component 120 is a lower-layer fault management system; for still another example, between the wireless service component 160 and the infrastructure component 120, a fault management system corresponding to the wireless service component 160 is a higher-layer fault management system, and a fault management system corresponding to the infrastructure component 120 is a lower-layer fault management system.

The hierarchy division of the foregoing mobile communications system is merely exemplified, and in different embodiments, division structures of the mobile communications system may be different from each other, which is not specifically limited. Additionally, it should be noted that, for convenience of description, a "service" described in this specification generally refers to a component such as a physical facility, a resource, a service or a service in a mobile communications system, for example, a cell, a base station, a transmission link, a transmission board, a base-band board and the like are all collectively referred to as services.

Figure 2:
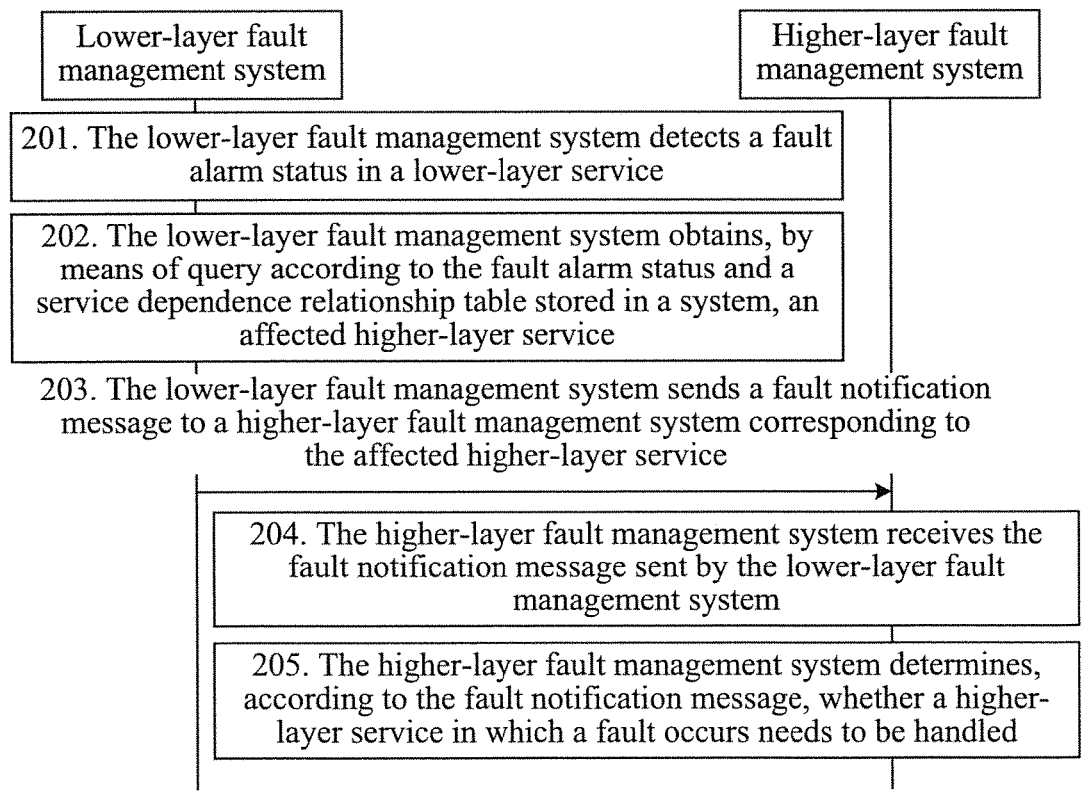
FIG. 2 is a method flowchart of a fault handling method according to an embodiment of the present invention.

Referring to FIG. 2, FIG. 2 shows a method flowchart of a fault handling method according to an embodiment of the present invention. The fault handling method is used for a communication fault management system, and the communication fault management system includes at least one lower-layer fault management system and at least one higher-layer fault management system. The fault handling method includes:

Step 201: A lower-layer fault management system detects a fault alarm status in a lower-layer service.

A lower-layer fault management system detects a fault alarm status in a lower-layer service. The fault alarm status may be either of two types: a fault occurs in a lower-layer service; and, a fault of a lower-layer service is already restored.

For example, the lower-layer fault management system detects that a fault occurs in a lower-layer service A, or, the lower-layer fault management system detects that a fault occurring in a lower-layer service A is already restored.

Step 202: The lower-layer fault management system obtains, by means of query according to the fault alarm status and a service dependence relationship table stored in a system, an affected higher-layer service.

In an implementation manner, the lower-layer fault management system is configured in advance to store a service dependence relationship table, and the service dependence relationship table is a correspondence between a lower-layer service and a higher-layer service running in dependence on the lower-layer service. In another implementation manner, the service dependence relationship table stored in the lower-layer fault management system may be dynamically generated according to statuses of running between services.

For example, a service dependence relationship exists between the lower-layer service A and a higher-layer service B, that is, running of the higher-layer service B depends on the lower-layer service A.

When a fault alarm status is detected, the lower-layer fault management system obtains, by means of query according to the fault alarm status and a service dependence relationship table stored in a system, an affected higher-layer service.

For example, the lower-layer fault management system obtains, by means of query, that the affected higher-layer service is B.

Step 203: The lower-layer fault management system sends a fault notification message to a higher-layer fault management system corresponding to the affected higher-layer service.

The lower-layer fault management system sends a fault notification message to a higher-layer fault management system corresponding to the affected higher-layer service B. The fault notification message may be either of two types: a fault generation message and a fault restoration message.

If the fault alarm status is that a fault occurs in a lower-layer service, a fault generation message is sent; or if the fault alarm status is that a fault of a lower-layer service is already restored, a fault restoration message is sent.

Step 204: The higher-layer fault management system receives the fault notification message sent by the lower-layer fault management system.

Step 205: The higher-layer fault management system determines, according to the fault notification message, whether a higher-layer service in which a fault occurs needs to be handled.

The higher-layer fault management system determines, according to the fault notification message, whether a higher-layer service in which a fault occurs may be caused by a fault of a lower-layer service.

If the fault of the higher-layer service may be caused by the fault of the lower-layer service, pend handling of the fault of the higher-layer service, so as to reduce unnecessary waste of maintenance resources; or if the fault of the higher-layer service is impossibly caused by the fault of the lower-layer service, handle the fault of the higher-layer service.

To sum up, in the fault handling method provided in this embodiment, at least two fault management systems are arranged, and when a fault alarm status of a lower-layer service is detected, a lower-layer fault management system obtains, by means of query according to the fault alarm status and a service dependence relationship table stored in a system, an affected higher-layer service; and sends a fault notification message to a higher-layer fault management system corresponding to the affected higher-layer service, so that the higher-layer fault management system determines, according to the fault notification message, whether a higher-layer service in which a fault occurs needs to be handled, which resolves a problem that in a scenario in which different operators operate a same mobile communications system at the same time, an existing fault management system may cause some operators to waste manpower or material resources during fault maintenance; and achieves an effect that when a fault occurs in the lower-layer service, the higher-layer fault management system may determine for the higher-layer service in which the fault occurs, according to the fault notification message, whether the higher-layer service in which the fault occurs needs to be handled, thereby reducing unnecessary waste of maintenance resources.

Figures 1, 3A:
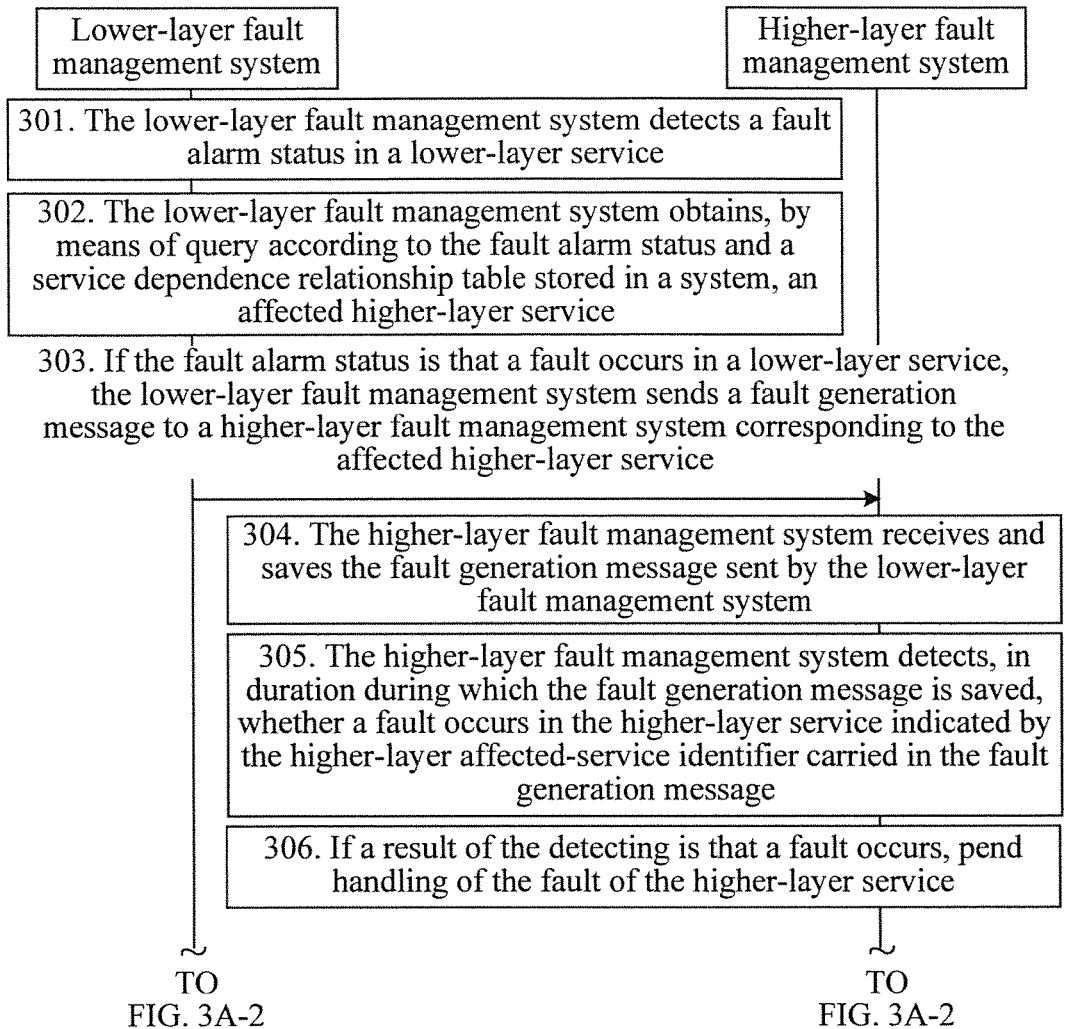
Figures 2, 3A:
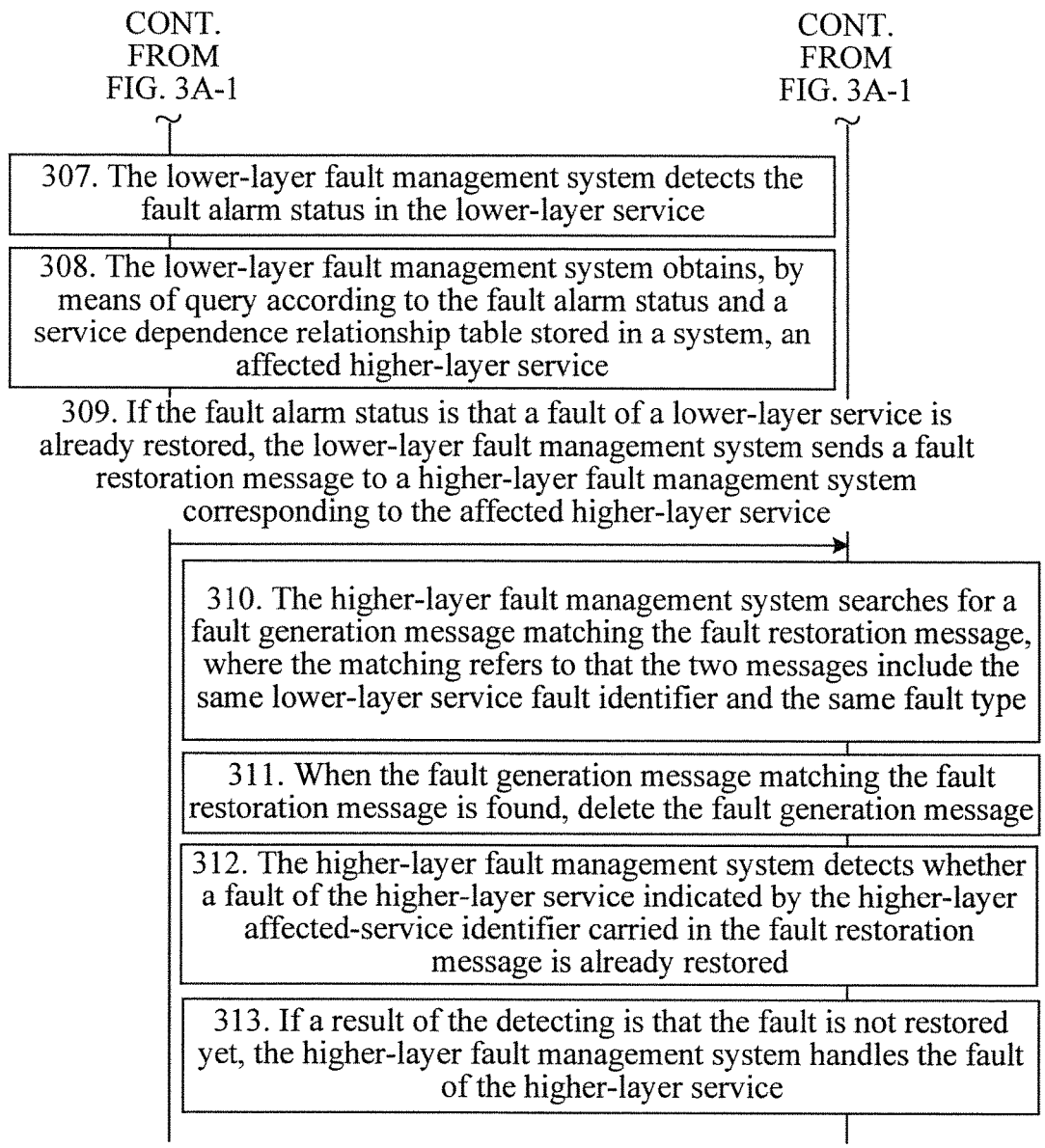

Referring to FIG. 3A-1 and FIG. 3A-2, FIG. 3A-1 and FIG. 3A-2 show a method flowchart of a fault handling method according to another embodiment of the present invention. The fault handling method is used for a communication fault management system, and the communication fault management system includes at least one lower-layer fault management system and at least one higher-layer fault management system. The fault handling method includes:

Step 301: A lower-layer fault management system detects a fault alarm status in a lower-layer service.

The lower-layer fault management system detects the fault alarm status in the lower-layer service. A fault alarm detection process may be performed by using an existing fault detection technology, which is not described again.

The fault alarm status may be either of two types: a fault occurs in a lower-layer service; and, a fault of a lower-layer service is already restored. In this step, it is assumed that the fault alarm status is the former one, for example, the lower-layer fault management system detects that a fault occurs in a lower-layer service A.

Step 302: The lower-layer fault management system obtains, by means of query according to the fault alarm status and a service dependence relationship table stored in a system, an affected higher-layer service.

Specifically, the lower-layer fault management system first obtains a lower-layer service fault identifier according to the fault alarm status, where the lower-layer service fault identifier is used for indicating a lower-layer service in which a fault alarm occurs, and then, the lower-layer fault management system queries a service dependence relationship table stored in a system for a higher-layer affected-service identifier by using the lower-layer service fault identifier, where higher-layer affected-service identifier is used for indicating a higher-layer service affected by the lower-layer service in which the fault alarm occurs.

For example, if the fault alarm status is that a fault occurs in the lower-layer service A, the lower-layer fault management system obtains a lower-layer service fault identifier A, and then obtains, by means of query according to the service dependence relationship table stored in the system, a higher-layer affected-service identifier B, where the higher-layer affected-service identifier B is used for indicating a higher-layer service B affected by the lower-layer service A in which a fault alarm occurs.

Step 303: If the fault alarm status is that a fault occurs in a lower-layer service, the lower-layer fault management system sends a fault generation message to a higher-layer fault management system corresponding to the affected higher-layer service.

If the fault alarm status is that a fault occurs in a lower-layer service, the lower-layer fault management system sends a fault generation message to a higher-layer fault management system corresponding to the affected higher-layer service, where the fault generation message at least carries a higher-layer affected-service identifier. The higher-layer affected-service identifier carried in the fault generation message may be used by the higher-layer fault management system to perform fault locating.

Preferably, the fault generation message further carries a lower-layer service fault identifier and a fault type. A format of a fault generation message is as follows:

The lower-layer service fault identifier includes two denotation manners: 1, lower-layer service name; and 2, lower-layer service type+service ID.

The higher-layer affected-service identifier includes two denotation manners: 1, higher-layer service name; and 2, higher-layer service type+service ID.

Step 304: The higher-layer fault management system receives and saves the fault generation message sent by the lower-layer fault management system.

The higher-layer fault management system receives and saves the fault generation message sent by the lower-layer fault management system. Specifically, the higher-layer fault management system may save all received fault generation messages into a lower-layer fault information list, where these fault generation messages may come from a same lower-layer fault management system or different lower-layer fault management systems.

Step 305: The higher-layer fault management system detects, in a period during which the fault generation message is saved, whether a fault occurs in the higher-layer service indicated by the higher-layer affected-service identifier carried in the fault generation message.

The higher-layer fault management system detects, in a period during which the fault generation message is saved, whether a fault occurs in the higher-layer service indicated by the higher-layer affected-service identifier carried in the fault generation message. For example, if the higher-layer service B is indicated by the higher-layer affected-service identifier, the higher-layer fault management system needs to detect whether a fault occurs in the higher-layer service B.

Figure 3B:
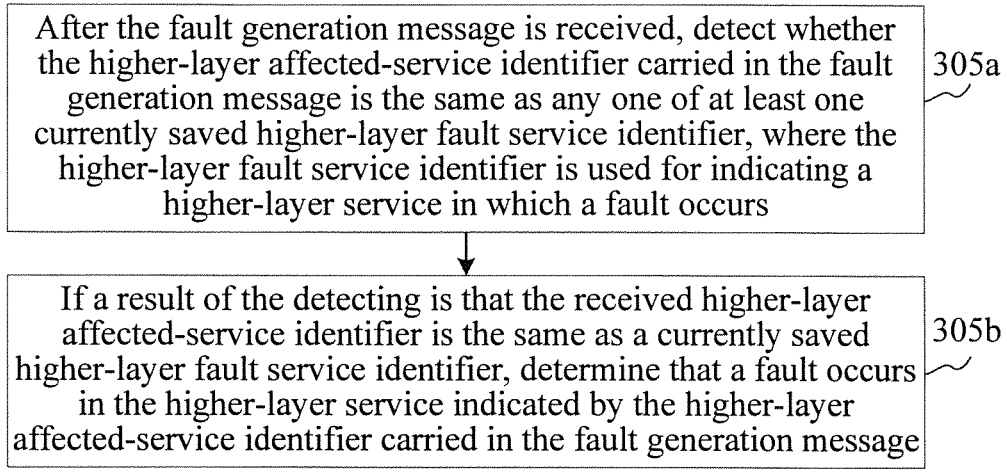
FIG. 3B is a flowchart of substeps of step 305 in the fault handling method provided in FIG. 3A-1 and FIG. 3A-2.

A moment at which the higher-layer fault management system detects whether the fault occurs in the higher-layer service and a moment at which the higher-layer fault management system receives the fault generation message are not necessarily the same, and may be different, and therefore, a detection process of this step may include two triggering manners. In one triggering manner, this step includes the following several substeps, as shown in FIG. 3B:

305a: After the fault generation message is received, detect whether the higher-layer affected-service identifier carried in the fault generation message is the same as any one of at least one currently saved higher-layer fault service identifier, where the higher-layer fault service identifier is used for indicating a higher-layer service in which a fault occurs.

Before receiving the fault generation message, the higher-layer fault management system may have already detected that a fault occurs in one or more higher-layer services, and therefore the higher-layer fault management system saves at least one higher-layer fault service identifier, where the higher-layer fault service identifier is used for indicating a higher-layer service in which a fault occurs. Specifically, the higher-layer fault management system may save at least one higher-layer fault service identifier into a higher-layer fault information list.

After receiving the fault generation message, the higher-layer fault management system detects whether the higher-layer affected-service identifier carried in the fault generation message is the same as anyone of the at least one currently saved higher-layer fault service identifier.

For example, when a newly received higher-layer affected-service identifier is "the higher-layer service B", the higher-layer fault management system traverses the higher-layer fault information list to determine whether a same higher-layer fault service identifier exists.

305b: If a result of the detecting is that the received higher-layer affected-service identifier is the same as a currently saved higher-layer fault service identifier, determine that a fault occurs in the higher-layer service indicated by the higher-layer affected-service identifier carried in the fault generation message.

Figure 3C:
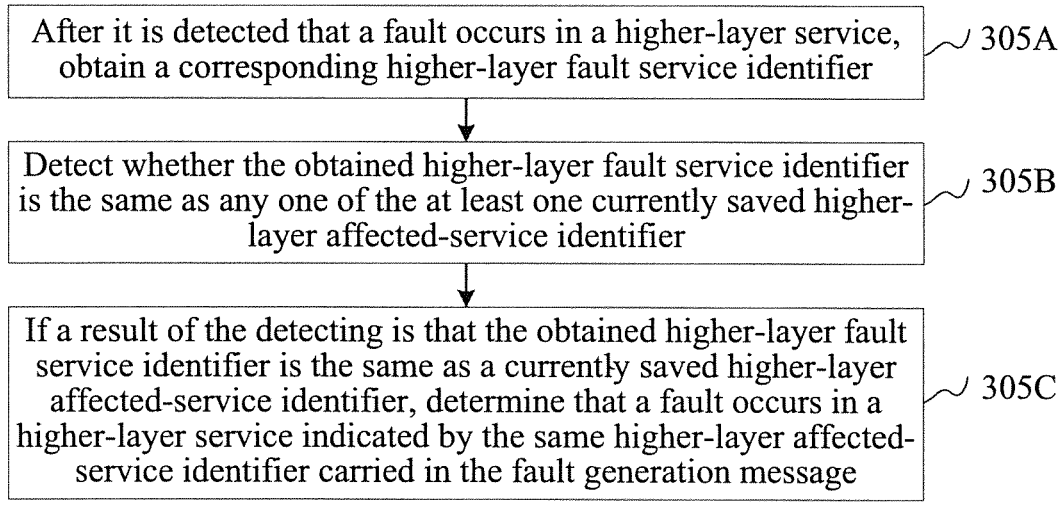
FIG. 3C is a flowchart of substeps of step 305 in the fault handling method provided in FIG. 3A-1 and FIG. 3A-2.

In the other triggering manner, this step includes the following substeps, as shown in FIG. 3C:

305A: After it is detected that a fault occurs in a higher-layer service, obtain a corresponding higher-layer fault service identifier.

The higher-layer fault management system detects a fault alarm status of a higher-layer service located on the current layer, and after detecting that a fault occurs in a higher-layer service, the higher-layer fault management system obtains a corresponding higher-layer fault service identifier, where the higher-layer fault service identifier is used for indicating the higher-layer service in which the fault occurs.

305B: Detect whether the obtained higher-layer fault service identifier is the same as any one of the at least one currently saved higher-layer affected-service identifier.

For example, when a newly obtained higher-layer fault service identifier is "the higher-layer service B", the higher-layer fault management system traverses the lower-layer fault information list to determine whether a same higher-layer affected-service identifier exists.

305C: If a result of the detecting is that the obtained higher-layer fault service identifier is the same as a currently saved higher-layer affected-service identifier, determine that a fault occurs in a higher-layer service indicated by the same higher-layer affected-service identifier carried in the fault generation message.

Preferably, if a result of the detecting is that the obtained higher-layer fault service identifier is different from all currently saved higher-layer affected-service identifiers, handling the fault of the higher-layer service indicated by the obtained higher-layer fault service identifier.

Step 306: If a result of the detecting is that a fault occurs, pend handling of the fault of the higher-layer service.

If a result of the detecting of step 305 is that a fault occurs, the higher-layer fault management system pends handling of the fault of the higher-layer service. When a fault occurs in a lower-layer service on which the higher-layer service depends, it is possible that the higher-layer service accordingly cannot run properly, and in this case, a fault of the higher-layer service may not be caused due to a reason of the higher-layer service, and therefore the higher-layer fault management system may pend handling of the fault of the higher-layer service, so as to reduce unnecessary dispatch, where the dispatch refers to that the fault management system automatically generates a dispatch work order, so as to dispatch an engineer to perform maintenance and construction.

Certainly, if a result of the detecting in step 305 is that no fault occurs, handling is not required.

Step 307: The lower-layer fault management system detects the fault alarm status in the lower-layer service.

The lower-layer fault management system detects the fault alarm status in the lower-layer service. A fault alarm detection process may be performed by using an existing fault detection technology, which is not described again.

The fault alarm status may be either of two types: a fault occurs in a lower-layer service; and, a fault of a lower-layer service is already restored. In this step, it is assumed that the fault alarm status is the latter one, for example, the lower-layer fault management system detects that the fault occurring in the lower-layer service A is already restored.

Step 308: The lower-layer fault management system obtains, by means of query according to the fault alarm status and a service dependence relationship table stored in a system, an affected higher-layer service.

Specifically, the lower-layer fault management system first obtains a lower-layer service fault identifier according to the fault alarm status, where the lower-layer service fault identifier is used for indicating a lower-layer service in which a fault alarm occurs, and then, the lower-layer fault management system queries a service dependence relationship table stored in a system for a higher-layer affected-service identifier by using the lower-layer service fault identifier, where higher-layer affected-service identifier is used for indicating a higher-layer service affected by the lower-layer service in which the fault alarm occurs.

For example, if the fault alarm status is that the fault of the lower-layer service A is already restored, the lower-layer fault management system obtains a lower-layer service fault identifier A, and then obtains, by means of query according to the service dependence relationship table stored in the system, a higher-layer affected-service identifier B, where the higher-layer affected-service identifier B is used for indicating a higher-layer service B affected by the lower-layer service A in which a fault alarm occurs.

Step 309: If the fault alarm status is that a fault of a lower-layer service is already restored, the lower-layer fault management system sends a fault restoration message to a higher-layer fault management system corresponding to the affected higher-layer service.

If the fault alarm status is that a fault of a lower-layer service is already restored, the lower-layer fault management system sends a fault restoration message to a higher-layer fault management system corresponding to the affected higher-layer service, where the fault restoration message at least carries a higher-layer affected-service identifier. The higher-layer affected-service identifier carried in the fault restoration message may be used by the higher-layer fault management system to perform fault locating.

Preferably, the fault restoration message further carries a lower-layer service fault identifier and a fault type. A format of a fault restoration message is as follows:

The lower-layer service fault identifier includes two denotation manners: 1, lower-layer service name; and 2, lower-layer service type+service ID.

The higher-layer affected-service identifier includes two denotation manners: 1, higher-layer service name; and 2, higher-layer service type+service ID.

Correspondingly, the higher-layer fault management system receives the fault restoration message sent by the lower-layer fault management system.

Step 310: The higher-layer fault management system searches for a fault generation message matching the fault restoration message, where the matching refers to that the two messages include the same lower-layer service fault identifier and the same fault type.

Preferably, when receiving the fault restoration message, the higher-layer fault management system searches for a fault generation message matching the fault restoration message. The matching refers to that the two messages include the same lower-layer service fault identifier and the same fault type. Different types of faults may occur in a same lower-layer service, and a same type of faults may also occur in different lower-layer services, and therefore, it can indicate that the two messages are both directed to a same fault of a same lower-layer service only when these two parameters are both the same.

Step 311: When the fault generation message matching the fault restoration message is found, delete the fault generation message.

Specifically, when the fault generation message matching the fault restoration message is found, the higher-layer fault management system may delete the matching fault generation message from the locally saved lower-layer fault information list.

Step 312: The higher-layer fault management system detects whether a fault of the higher-layer service indicated by the higher-layer affected-service identifier carried in the fault restoration message is already restored.

For example, if the higher-layer service B is indicated by the higher-layer affected-service identifier carried in the fault restoration message, the higher-layer fault management system locally detects whether the fault of the higher-layer service B is already restored.

Step 313: If a result of the detecting is that the fault is not restored yet, the higher-layer fault management system handles the fault of the higher-layer service.

If a result of the detecting is that the fault of the higher-layer service B is not restored yet, and because the fault of the lower-layer service A on which the higher-layer service B depends is already restored, it can be determined that the fault of the higher-layer service B is not caused by the fault of the lower-layer service A, the higher-layer fault management system needs to handle the fault of the higher-layer service B.

Additionally, if a result of the detecting is that the fault of the higher-layer service B is also restored at the same time, it can be determined that the fault of the higher-layer service B is caused by the fault of the lower-layer service A, and therefore the higher-layer fault management system does not need to handle the fault of the higher-layer service B. If a result of the detecting is that no fault occurs in the higher-layer service B, the higher-layer fault management system does not need to perform any handling either.

To sum up, in the fault handling method provided in this embodiment, a higher-layer fault management system detects, in a period during which a fault generation message is saved, whether a fault occurs in a higher-layer service indicated by a higher-layer affected-service identifier carried in the fault generation message; and if a result of the detecting is that a fault occurs, pends handling of the fault of the higher-layer service, thereby achieving an effect that in a scenario in which multiple operators operate a same mobile communications system at the same time, unnecessary dispatch is reduced, so as to avoid waste of material resources and manpower resources during maintenance.

In the fault handling method provided in this embodiment, further, a higher-layer fault management system detects whether a fault of a higher-layer service indicated by a higher-layer affected-service identifier carried in a fault restoration message is already restored; and if a result of the detecting is that the fault is not restored yet, handles the fault of the higher-layer service, thereby achieving an effect that in a scenario in which multiple operators operate a same mobile communications system at the same time, a fault source of the higher-layer service is located between different operators accurately, and a fault maintenance task is appropriately allocated.

The embodiments of the present invention further provide apparatus embodiments for implementing methods or steps in the foregoing method embodiments. The following are the apparatus embodiments of the present invention, and for details that are not specifically described in the apparatus embodiments, reference may be made to the foregoing corresponding method embodiments.

Figure 4:
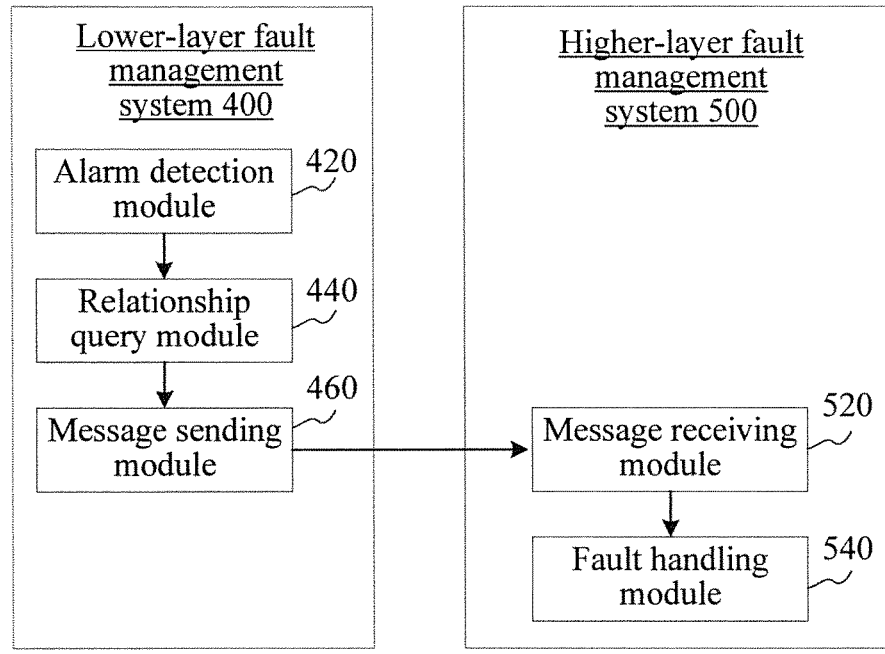
FIG. 4 is a structural block diagram of a communication fault management system according to an embodiment of the present invention.

Referring to FIG. 4, FIG. 4 shows a schematic structural diagram of a communication fault management system according to an embodiment of the present invention. The communication fault management system includes at least one lower-layer fault management system 400 and at least one higher-layer fault management system 500.

The lower-layer fault management system 400 includes a fault handling apparatus, and the fault handling apparatus may be implemented by using software, hardware or a combination of both the software and hardware to become a part of the lower-layer fault management system 400. The fault handling apparatus includes: an alarm detection module 420, a relationship query module 440, and a message sending module 460;

the alarm detection module 420 is configured to detect a fault alarm status in a lower-layer service;

the relationship query module 440 is configured to obtain, by means of query according to the fault alarm status and a service dependence relationship table stored in a system, an affected higher-layer service; and the message sending module 460 is configured to send a fault notification message to the higher-layer fault management system corresponding to the affected higher-layer service, so that the higher-layer fault management system receives the fault notification message sent by the lower-layer fault management system, and determines, according to the fault notification message, whether a higher-layer service in which a fault occurs needs to be handled, where the service dependence relationship table is a correspondence between a lower-layer service and a higher-layer service running in dependence on the lower-layer service.

The higher-layer fault management system 500 includes a fault handling apparatus, and the fault handling apparatus may be implemented by using software, hardware or a combination of both the software and hardware to become a part of the higher-layer fault management system 500. The fault handling apparatus includes: a message receiving module 520 and a fault handling module 540.

The message receiving module 520 is configured to receive a fault notification message sent by the lower-layer fault management system, where the lower-layer fault management system detects a fault alarm status in a lower-layer service, obtains, by means of query according to the fault alarm status and a service dependence relationship table stored in a system, an affected higher-layer service, and then sends the fault notification message to the higher-layer fault management system corresponding to the affected higher-layer service; and the fault handling module 540 is configured to determine, according to the fault notification message, whether a higher-layer service in which a fault occurs needs to be handled, where the service dependence relationship table is a correspondence between a lower-layer service and a higher-layer service running in dependence on the lower-layer service.

To sum up, in the communication fault handling system provided in this embodiment, at least two fault management systems are arranged, and when a fault alarm status of a lower-layer service is detected, a lower-layer fault management system obtains, by means of query according to the fault alarm status and a service dependence relationship table stored in a system, an affected higher-layer service; and sends a fault notification message to a higher-layer fault management system corresponding to the affected higher-layer service, so that the higher-layer fault management system determines, according to the fault notification message, whether a higher-layer service in which a fault occurs needs to be handled, which resolves a problem that in a scenario in which different operators operate a same mobile communications system at the same time, an existing fault management system may cause some operators to waste manpower or material resources during fault maintenance; and achieves an effect that when a fault occurs in the lower-layer service, the higher-layer fault management system may determine for the higher-layer service in which the fault occurs, according to the fault notification message, whether the higher-layer service in which the fault occurs needs to be handled, thereby reducing unnecessary waste of maintenance resources.

Figure 5:
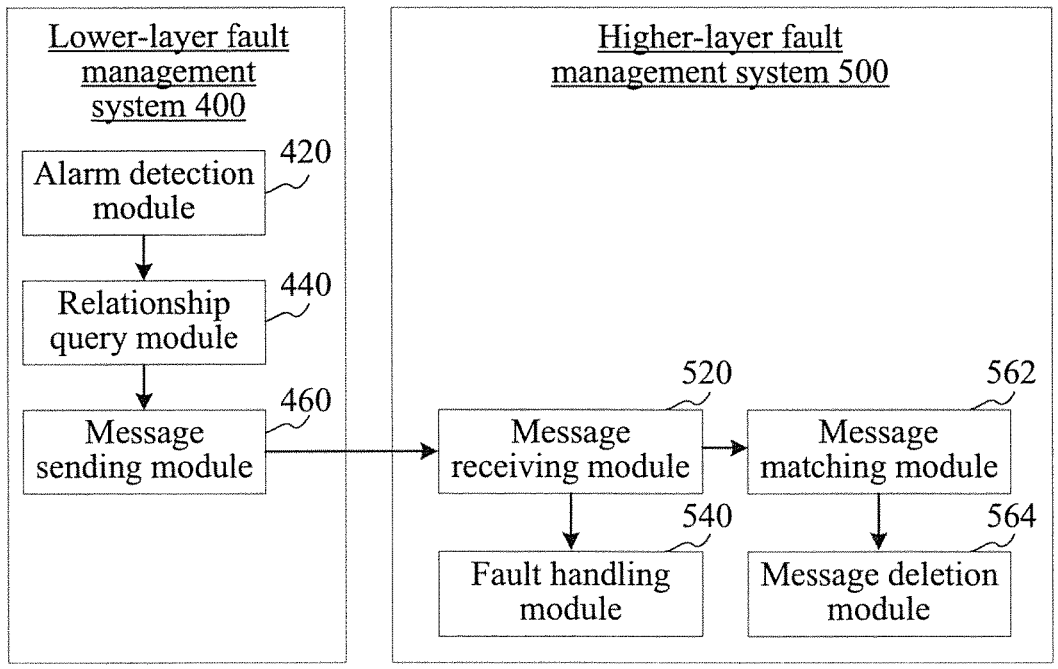
FIG. 5 is a structural block diagram of a communication fault management system according to another embodiment of the present invention.

Referring to FIG. 5, FIG. 5 shows a schematic structural diagram of a communication fault management system according to another embodiment of the present invention. The communication fault management system includes at least one lower-layer fault management system 400 and at least one higher-layer fault management system 500.

The lower-layer fault management system 400 includes a fault handling apparatus, and the fault handling apparatus may be implemented by using software, hardware or a combination of both the software and hardware to become a part of the lower-layer fault management system 400. The fault handling apparatus includes: an alarm detection module 420, a relationship query module 440, and a message sending module 460.

The alarm detection module 420 is configured to detect a fault alarm status in a lower-layer service;

the relationship query module 440 is configured to obtain, by means of query according to the fault alarm status and a service dependence relationship table stored in a system, an affected higher-layer service; and the message sending module 460 is configured to send a fault notification message to the higher-layer fault management system corresponding to the affected higher-layer service, so that the higher-layer fault management system receives the fault notification message sent by the lower-layer fault management system, and determines, according to the fault notification message, whether a higher-layer service in which a fault occurs needs to be handled, where the service dependence relationship table is a correspondence between a lower-layer service and a higher-layer service running in dependence on the lower-layer service.

Preferably, if the fault alarm status is that a fault occurs in a lower-layer service, the message sending module 460 is configured to send a fault generation message to the higher-layer fault management system corresponding to the affected higher-layer service, where the fault generation message carries a higher-layer affected-service identifier, and the higher-layer affected-service identifier is used for indicating a higher-layer service affected by a lower-layer service in which a fault alarm occurs, so that the higher-layer fault management system receives and saves the fault generation message sent by the lower-layer fault management system; detects, in a period during which the fault generation message is saved, whether a fault occurs in the higher-layer service indicated by the higher-layer affected-service identifier carried in the fault generation message; and if a result of the detecting is that a fault occurs, pends handling of the fault of the higher-layer service.

Preferably, if the fault alarm status is that a fault of a lower-layer service is already restored, the message sending module 460 is configured to send a fault restoration message to the higher-layer fault management system corresponding to the affected higher-layer service, where the fault restoration message carries a higher-layer affected-service identifier, and the higher-layer affected-service identifier is used for indicating a higher-layer service affected by a lower-layer service in which a fault alarm occurs, so that the higher-layer fault management system receives the fault restoration message sent by the lower-layer fault management system; detects whether a fault of the higher-layer service indicated by the higher-layer affected-service identifier carried in the fault restoration message is already restored; and if a result of the detecting is that the fault is not restored yet, handles the fault of the higher-layer service.

Preferably, both the fault generation message and the fault restoration message further carry a lower-layer service fault identifier and a fault type, and the lower-layer service fault identifier is used for indicating the lower-layer service in which a fault alarm occurs, so that the higher-layer fault management system searches for a fault generation message matching the fault restoration message, where the matching refers to that the two messages include the same lower-layer service fault identifier and the same fault type; and when the fault generation message matching the fault restoration message is found, deletes the fault generation message.

The higher-layer fault management system 500 includes a fault handling apparatus, and the fault handling apparatus may be implemented by using software, hardware or a combination of both the software and hardware to become a part of the higher-layer fault management system 500. The fault handling apparatus includes: a message receiving module 520, a fault handling module 540, a message matching module 562, and a message deletion module 564.

The message receiving module 520 is configured to receive a fault notification message sent by the lower-layer fault management system, where the lower-layer fault management system detects a fault alarm status in a lower-layer service, obtains, by means of query according to the fault alarm status and a service dependence relationship table stored in a system, an affected higher-layer service, and then sends the fault notification message to the higher-layer fault management system corresponding to the affected higher-layer service; and the fault handling module 540 is configured to determine, according to the fault notification message, whether a higher-layer service in which a fault occurs needs to be handled, where the service dependence relationship table is a correspondence between a lower-layer service and a higher-layer service running in dependence on the lower-layer service.

Preferably, the message receiving module 520 is configured to receive and save a fault generation message sent by the lower-layer fault management system, where the fault generation message carries a higher-layer affected-service identifier, and the higher-layer affected-service identifier is used for indicating a higher-layer service affected by a lower-layer service in which a fault alarm occurs; and the fault handling module 540 is configured to detect, in a period during which the fault generation message is saved, whether a fault occurs in the higher-layer service indicated by the higher-layer affected-service identifier carried in the fault generation message; and if a result of the detecting is that a fault occurs, pend handling of the fault of the higher-layer service.

Preferably, the fault handling module 540 includes a first detection unit and a first determining unit;

the first detection unit is configured to: after the fault generation message is received, detect whether the higher-layer affected-service identifier carried in the fault generation message is the same as any one of at least one currently saved higher-layer fault service identifier, where the higher-layer fault service identifier is used for indicating a higher-layer service in which a fault occurs; and the first determining unit is configured to: if a result of the detecting is that the received higher-layer affected-service identifier is the same as a currently saved higher-layer fault service identifier, determine that a fault occurs in the higher-layer service indicated by the higher-layer affected-service identifier carried in the fault generation message.

Preferably, the fault handling module 540 includes an identifier obtaining unit, a second detection unit, and a second determining unit;

the identifier obtaining unit is configured to: after it is detected that a fault occurs in a higher-layer service, obtain a corresponding higher-layer fault service identifier, where the higher-layer fault service identifier is used for indicating a higher-layer service in which a fault occurs;

the second detection unit is configured to detect whether the obtained higher-layer fault service identifier is the same as any one of the at least one currently saved higher-layer affected-service identifier; and the second determining unit is configured to: if a result of the detecting is that the obtained higher-layer fault service identifier is the same as a currently saved higher-layer affected-service identifier, determine that a fault occurs in a higher-layer service indicated by the same higher-layer affected-service identifier carried in the fault generation message.

Preferably, the fault handling module 540 further includes a third determining unit; and the third determining unit is configured to: if a result of the detecting is that the obtained higher-layer fault service identifier is different from all currently saved higher-layer affected-service identifiers, handle the fault of the higher-layer service indicated by the obtained higher-layer fault service identifier.

Preferably, the message receiving module 520 is further configured to receive a fault restoration message sent by the lower-layer fault management system, where the fault restoration message carries the higher-layer affected-service identifier; and the fault handling module 540 is further configured to detect whether a fault of the higher-layer service indicated by the higher-layer affected-service identifier carried in the fault restoration message is already restored; and if a result of the detecting is that the fault is not restored yet, handle the fault of the higher-layer service.

Preferably, both the fault generation message and the fault restoration message further carry a lower-layer service fault identifier and a fault type, and the lower-layer service fault identifier is used for indicating the lower-layer service in which a fault alarm occurs;

the apparatus further includes a message matching module 562 and a message deletion module 564;

the message matching module 562 is configured to search for a fault generation message matching the fault restoration message, where the matching refers to that the two messages include the same lower-layer service fault identifier and the same fault type; and the message deletion module 564 is configured to: when the fault generation message matching the fault restoration message is found, delete the fault generation message.

To sum up, in the communication fault management system provided in this embodiment, a higher-layer fault management system detects, in a period during which a fault generation message is saved, whether a fault occurs in a higher-layer service indicated by a higher-layer affected-service identifier carried in the fault generation message; and if a result of the detecting is that a fault occurs, pends handling of the fault of the higher-layer service, thereby achieving an effect that in a scenario in which multiple operators operate a same mobile communications system at the same time, unnecessary dispatch is reduced, so as to avoid waste of material resources and manpower resources during maintenance.

In the communication fault management system provided in this embodiment, further, a higher-layer fault management system detects whether a fault of a higher-layer service indicated by a higher-layer affected-service identifier carried in a fault restoration message is already restored; and if a result of the detecting is that the fault is not restored yet, handles the fault of the higher-layer service, thereby achieving an effect that in a scenario in which multiple operators operate a same mobile communications system at the same time, a fault source of the higher-layer service is located between different operators accurately, and a fault maintenance task is appropriately allocated.

Figure 6:
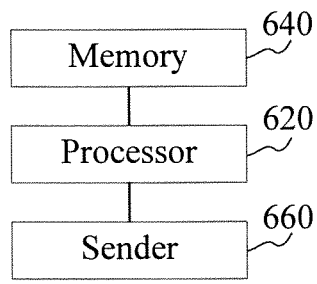
FIG. 6 is a structural block diagram of a fault management system according to an embodiment of the present invention.

Referring to FIG. 6, FIG. 6 shows a schematic structural diagram of a fault management system according to an embodiment of the present invention. The fault management system is configured to be implemented as a lower-layer fault management system in a communication fault management system, and the system includes: a processor 620, a memory 640, and a sender 660.

The processor 620 is configured to detect a fault alarm status in a lower-layer service;

the processor 620 is further configured to obtain, by means of query according to the fault alarm status and a service dependence relationship table stored in a system in the memory 640, an affected higher-layer service; and the processor 620 is further configured to control the sender 660 to send a fault notification message to the higher-layer fault management system corresponding to the affected higher-layer service, so that the higher-layer fault management system receives the fault notification message sent by the lower-layer fault management system, and determines, according to the fault notification message, whether a higher-layer service in which a fault occurs needs to be handled, where the service dependence relationship table is a correspondence between a lower-layer service and a higher-layer service running in dependence on the lower-layer service.

In a more preferable embodiment, if the fault alarm status is that a fault occurs in a lower-layer service, the processor 620 is further configured to control the sender 660 to send a fault generation message to the higher-layer fault management system corresponding to the affected higher-layer service, where the fault generation message carries a higher-layer affected-service identifier, and the higher-layer affected-service identifier is used for indicating a higher-layer service affected by a lower-layer service in which a fault alarm occurs, so that the higher-layer fault management system receives and saves the fault generation message sent by the lower-layer fault management system; detects, in a period during which the fault generation message is saved, whether a fault occurs in the higher-layer service indicated by the higher-layer affected-service identifier carried in the fault generation message; and if a result of the detecting is that a fault occurs, pends handling of the fault of the higher-layer service.

In a more preferable embodiment, if the fault alarm status is that a fault of a lower-layer service is already restored, the processor 620 is further configured to control the sender 640 to send a fault restoration message to the higher-layer fault management system corresponding to the affected higher-layer service, where the fault restoration message carries a higher-layer affected-service identifier, and the higher-layer affected-service identifier is used for indicating a higher-layer service affected by a lower-layer service in which a fault alarm occurs, so that the higher-layer fault management system receives the fault restoration message sent by the lower-layer fault management system; detects whether a fault of the higher-layer service indicated by the higher-layer affected-service identifier carried in the fault restoration message is already restored; and if a result of the detecting is that the fault is not restored yet, handles the fault of the higher-layer service.

In a more preferable embodiment, both the fault generation message and the fault restoration message further carry a lower-layer service fault identifier and a fault type, and the lower-layer service fault identifier is used for indicating the lower-layer service in which a fault alarm occurs, so that the higher-layer fault management system searches for a fault generation message matching the fault restoration message, where the matching refers to that the two messages include the same lower-layer service fault identifier and the same fault type; and when the fault generation message matching the fault restoration message is found, deletes the fault generation message.

To sum up, in the fault management system provided in this embodiment, a higher-layer fault management system detects, in a period during which a fault generation message is saved, whether a fault occurs in a higher-layer service indicated by a higher-layer affected-service identifier carried in the fault generation message; and if a result of the detecting is that a fault occurs, pends handling of the fault of the higher-layer service, thereby achieving an effect that in a scenario in which multiple operators operate a same mobile communications system at the same time, unnecessary dispatch is reduced, so as to avoid waste of material resources and manpower resources during maintenance.

In the fault management system provided in this embodiment, further, a higher-layer fault management system detects whether a fault of a higher-layer service indicated by a higher-layer affected-service identifier carried in a fault restoration message is already restored; and if a result of the detecting is that the fault is not restored yet, handles the fault of the higher-layer service, thereby achieving an effect that in a scenario in which multiple operators operate a same mobile communications system at the same time, a fault source of the higher-layer service is located between different operators accurately, and a fault maintenance task is appropriately allocated.

Figure 7:
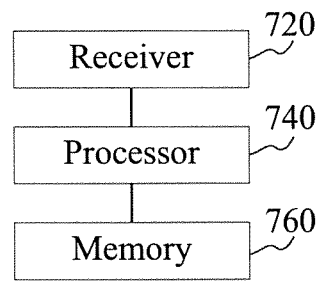
FIG. 7 is a structural block diagram of a fault management system according to another embodiment of the present invention.

Referring to FIG. 7, FIG. 7 shows a schematic structural diagram of a fault management system according to an embodiment of the present invention. The fault management system is configured to be implemented as a higher-layer fault management system in a communication fault management system, and the system includes: a receiver 720, a processor 740, and a memory 760.

The processor 740 is configured to control the receiver 720 to receive a fault notification message sent by the lower-layer fault management system, where the lower-layer fault management system detects a fault alarm status in a lower-layer service, obtains, by means of query according to the fault alarm status and a service dependence relationship table stored in a system, an affected higher-layer service, and then sends the fault notification message to the higher-layer fault management system corresponding to the affected higher-layer service; and the processor 740 is further configured to determine, according to the fault notification message, whether a higher-layer service in which a fault occurs needs to be handled, where the service dependence relationship table is a correspondence between a lower-layer service and a higher-layer service running in dependence on the lower-layer service.

In a more preferable embodiment, the processor 740 is further configured to control the receiver 720 to receive a fault generation message sent by the lower-layer fault management system, and save the fault generation message into the memory 760, where the fault generation message carries a higher-layer affected-service identifier, and the higher-layer affected-service identifier is used for indicating a higher-layer service affected by a lower-layer service in which a fault alarm occurs;

the processor 740 is further configured to detect, in a period during which the memory saves the fault generation message, whether a fault occurs in the higher-layer service indicated by the higher-layer affected-service identifier carried in the fault generation message; and the processor 740 is further configured to: if a result of the detecting is that a fault occurs, pend handling of the fault of the higher-layer service.

In a more preferable embodiment, the processor 740 is further configured to: after the receiver 720 is controlled to receive the fault generation message, detect whether the higher-layer affected-service identifier carried in the fault generation message is the same as any one of at least one higher-layer fault service identifier currently saved in the memory 760, where the higher-layer fault service identifier is used for indicating a higher-layer service in which a fault occurs; and the processor 740 is further configured to: if a result of the detecting is that the received higher-layer affected-service identifier is the same as a currently saved higher-layer fault service identifier, determine that a fault occurs in the higher-layer service indicated by the higher-layer affected-service identifier carried in the fault generation message.

In a more preferable embodiment, the processor 740 is further configured to: after it is detected that a fault occurs in a higher-layer service, obtain a corresponding higher-layer fault service identifier, where the higher-layer fault service identifier is used for indicating a higher-layer service in which a fault occurs;

the processor 740 is further configured to detect whether the obtained higher-layer fault service identifier is the same as any one of the at least one higher-layer affected-service identifier currently saved in the memory 760; and the processor 740 is further configured to: if a result of the detecting is that the obtained higher-layer fault service identifier is the same as a currently saved higher-layer affected-service identifier, determine that a fault occurs in a higher-layer service indicated by the same higher-layer affected-service identifier carried in the fault generation message.

In a more preferable embodiment, the processor 740 is further configured to: if a result of the detecting is that the obtained higher-layer fault service identifier is different from all currently saved higher-layer affected-service identifiers, handle the fault of the higher-layer service indicated by the obtained higher-layer fault service identifier.

In a more preferable embodiment, the processor 740 is further configured to control the receiver to receive a fault restoration message sent by the lower-layer fault management system, where the fault restoration message carries the higher-layer affected-service identifier;

the processor 740 is further configured to detect whether a fault of the higher-layer service indicated by the higher-layer affected-service identifier carried in the fault restoration message is already restored; and the processor 740 is further configured to: if a result of the detecting is that the fault is not restored yet, handle the fault of the higher-layer service.

In a more preferable embodiment, both the fault generation message and the fault restoration message further carry a lower-layer service fault identifier and a fault type, and the lower-layer service fault identifier is used for indicating the lower-layer service in which a fault alarm occurs;

the processor 740 is further configured to search for a fault generation message matching the fault restoration message, where the matching refers to that the two messages include the same lower-layer service fault identifier and the same fault type; and the processor 740 is further configured to: when the fault generation message matching the fault restoration message is found, delete the fault generation message.

To sum up, in the fault management system provided in this embodiment, a higher-layer fault management system detects, in a period during which a fault generation message is saved, whether a fault occurs in a higher-layer service indicated by a higher-layer affected-service identifier carried in the fault generation message; and if a result of the detecting is that a fault occurs, pends handling of the fault of the higher-layer service, thereby achieving an effect that in a scenario in which multiple operators operate a same mobile communications system at the same time, unnecessary dispatch is reduced, so as to avoid waste of material resources and manpower resources during maintenance.

In the fault management system provided in this embodiment, further, a higher-layer fault management system detects whether a fault of a higher-layer service indicated by a higher-layer affected-service identifier carried in a fault restoration message is already restored; and if a result of the detecting is that the fault is not restored yet, handles the fault of the higher-layer service, thereby achieving an effect that in a scenario in which multiple operators operate a same mobile communications system at the same time, a fault source of the higher-layer service is located between different operators accurately, and a fault maintenance task is appropriately allocated.

Figure 8:
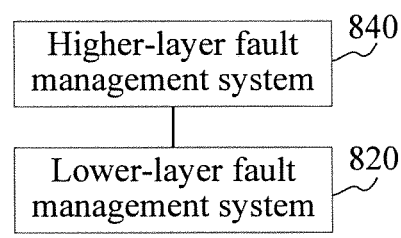
FIG. 8 is a structural block diagram of a communication fault management system according to an embodiment of the present invention.

Referring to FIG. 8, FIG. 8 shows a structural block diagram of a communication fault management system according to an embodiment of the present invention. The system includes at least one lower-layer fault management system 820 and at least one higher-layer fault management system 840.

The lower-layer fault management system 820 is the fault management system described in the embodiment shown in FIG. 6 and in the more preferable embodiments of the embodiment shown in FIG. 6; and the higher-layer fault management system 840 is the fault management system described in the embodiment shown in FIG. 7 and in the more preferable embodiments of the embodiment shown in FIG. 7.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A fault handling method, used for a lower-layer fault management system in a communication fault management system, wherein the communication fault management system comprises at least one lower-layer fault management system and at least one higher-layer fault management system, the method comprising:

detecting a fault alarm status in a lower-layer service;

obtaining, by means of query according to the fault alarm status and a service dependence relationship table stored in a system, an affected higher-layer service; and sending a fault notification message to the higher-layer fault management system corresponding to the affected higher-layer service, so that the higher-layer fault management system receives the fault notification message sent by the lower-layer fault management system, and determines, according to the fault notification message, whether a higher-layer service in which a fault occurs needs to be handled, wherein the service dependence relationship table is a correspondence between a lower-layer service and a higher-layer service running in dependence on the lower-layer service, wherein when the fault alarm status is that a fault of a lower-layer service is already restored, then sending a fault notification message to the higher-layer fault management system corresponding to the affected higher-layer service comprises:

sending a fault restoration message to the higher-layer fault management system corresponding to the affected higher-layer service, wherein the fault restoration message carries a higher-layer affected-service identifier used for indicating a higher-layer service affected by a lower-layer service in which a fault alarm occurs, so that the higher-layer fault management system receives the fault restoration message sent by the lower-layer fault management system, detects whether a fault of the higher-layer service indicated by the higher-layer affected-service identifier carried in the fault restoration message is already restored, and if a result of the detecting is that the fault is not restored yet, handles the fault of the higher-layer service.

2. The fault handling method according to claim 1, wherein when the fault alarm status is that a fault occurs in a lower-layer service, sending the fault notification message to the higher-layer fault management system corresponding to the affected higher-layer service comprises:

sending a fault generation message to the higher-layer fault management system corresponding to the affected higher-layer service, wherein the fault generation message carries the higher-layer affected-service identifier, so that the higher-layer fault management system:

receives and saves the fault generation message sent by the lower-layer fault management system, detects, in a period during which the fault generation message is saved, whether a fault occurs in the higher-layer service indicated by the higher-layer affected-service identifier carried in the fault generation message, and if a result of the detecting is that a fault occurs, delays handling of the fault of the higher-layer service.

3. The fault handling method according to claim 2, wherein:
both the fault generation message and the fault restoration message further carry a lower-layer service fault identifier and a fault type, and the lower-layer service fault identifier is used for indicating the lower-layer service in which a fault alarm occurs, so that the higher-layer fault management system searches for a fault generation message matching the fault restoration message, wherein the matching refers to that the two messages comprise the same lower-layer service fault identifier and the same fault type; and
when the fault generation message matching the fault restoration message is found, deletes the fault generation message.

4. A fault management system, configured to be implemented as a lower-layer fault management system in a communication fault management system, wherein the communication fault management system comprises at least one lower-layer fault management system and at least one higher-layer fault management system, the fault management system comprising:
a memory;
a sender; and
a processor configured to:
detect a fault alarm status in a lower-layer service,
obtain, by means of query according to the fault alarm status and a service dependence relationship table stored in a system in the memory, an affected higher-layer service;
control the sender to send a fault notification message to the higher-layer fault management system corresponding to the affected higher-layer service, so that the higher-layer fault management system receives the fault notification message sent by the lower-layer fault management system, and determines, according to the fault notification message, whether a higher-layer service in which a fault occurs needs to be handled, wherein the service dependence relationship table is a correspondence between a lower-layer service and a higher-layer service running in dependence on the lower-layer service; and
when the fault alarm status is that a fault of a lower-layer service is already restored, control the sender to send a fault restoration message to the higher-layer fault management system corresponding to the affected higher-layer service, wherein the fault restoration message carries a higher-layer affected-service identifier used for indicating a higher-layer service affected by a lower-layer service in which a fault alarm occurs, so that the higher-layer fault management system receives the fault restoration message sent by the lower-layer fault management system, detects whether a fault of the higher-layer service indicated by the higher-layer affected-service identifier carried in the fault restoration message is already restored, and if a result of the detecting is that the fault is not restored yet, handles the fault of the higher-layer service.

5. The fault handling system according to claim 4, wherein when the fault alarm status is that a fault occurs in a lower-layer service, the processor is further configured to:
control the sender to send a fault generation message to the higher-layer fault management system corresponding to the affected higher-layer service, wherein the fault generation message carries the higher-layer affected-service identifier, so that the higher-layer fault management system receives and saves the fault generation message sent by the lower-layer fault management system, detects, in a period during which the fault generation message is saved, whether a fault occurs in the higher-layer service indicated by the higher-layer affected-service identifier carried in the fault generation message, and if a result of the detecting is that a fault occurs, delays handling of the fault of the higher-layer service.

6. The fault handling system according to claim 5, wherein:
both the fault generation message and the fault restoration message further carry a lower-layer service fault identifier and a fault type, and the lower-layer service fault identifier is used for indicating the lower-layer service in which a fault alarm occurs, so that the higher-layer fault management system searches for a fault generation message matching the fault restoration message, wherein the matching refers to that the two messages comprise the same lower-layer service fault identifier and the same fault type; and
when the fault generation message matching the fault restoration message is found, deletes the fault generation message.

7. A fault handling system, configured to be implemented as a higher-layer fault management system in a communication fault management system, wherein the communication fault management system comprises at least one lower-layer fault management system and at least one higher-layer fault management system, the fault handling system comprises:
a receiver;
a memory; and
a processor configured to:
control the receiver to receive a fault notification message sent by the lower-layer fault management system, wherein the lower-layer fault management system detects a fault alarm status in a lower-layer service, obtains, by means of query according to the fault alarm status and a service dependence relationship table stored in a system, an affected higher-layer service, and then sends the fault notification message to the higher-layer fault management system corresponding to the affected higher-layer service,
determine, according to the fault notification message, whether a higher-layer service in which a fault occurs needs to be handled, wherein the service dependence relationship table is a correspondence between a lower-layer service and a higher-layer service running in dependence on the lower-layer service,
control the receiver to receive a fault restoration message sent by the lower-layer fault management system, wherein the fault restoration message carries a higher-layer affected-service identifier used for indicating a higher-layer service affected by a lower-layer service in which a fault alarm occurs;
detect whether a fault of the higher-layer service indicated by the higher-layer affected-service identifier carried in the fault restoration message is already restored; and
when a result of the detecting is that the fault is not yet restored, handle the fault of the higher-layer service.

8. The fault handling system according to claim 7, wherein the processor is further configured to:

control the receiver to receive a fault generation message sent by the lower-layer fault management system, and save the fault generation message into the memory, wherein the fault generation message carries the higher-layer affected-service identifier;

detect, in a period during which the memory saves the fault generation message, whether a fault occurs in the higher-layer service indicated by the higher-layer affected-service identifier carried in the fault generation message; and if a result of the detecting is that a fault occurs, delay handling of the fault of the higher-layer service.

9. The fault handling system according to claim 8, wherein the processor is further configured to:

after the receiver is controlled to receive the fault generation message, detect whether the higher-layer affected-service identifier carried in the fault generation message is the same as any one of at least one higher-layer fault service identifier currently saved in the memory, wherein the higher-layer fault service identifier is used for indicating a higher-layer service in which a fault occurs; and if a result of the detecting is that the received higher-layer affected-service identifier is the same as a currently saved higher-layer fault service identifier, determine that a fault occurs in the higher-layer service indicated by the higher-layer affected-service identifier carried in the fault generation message.

10. The fault handling system according to claim 8, wherein the processor is further configured to:

after it is detected that a fault occurs in a higher-layer service, obtain a corresponding higher-layer fault service identifier, wherein the higher-layer fault service identifier is used for indicating a higher-layer service in which a fault occurs;

detect whether the obtained higher-layer fault service identifier is the same as any one of the at least one higher-layer affected-service identifier currently saved in the memory; and if a result of the detecting is that the obtained higher-layer fault service identifier is the same as a currently saved higher-layer affected-service identifier, determine that a fault occurs in a higher-layer service indicated by the same higher-layer affected-service identifier carried in the fault generation message.

11. The fault handling system according to claim 10, wherein the processor is further configured to:

if a result of the detecting is that the obtained hi her-layer fault service identifier is different from all currently saved higher-layer affected-service identifiers, handle the fault of the higher-layer service indicated by the obtained higher-layer fault service identifier.

12. The fault handling system according to claim 8, wherein: both the fault generation message and the fault restoration message further carry a lower-layer service fault identifier and a fault type, and the lower-layer service fault identifier is used for indicating the lower-layer service in which a fault alarm occurs; and the processor is further configured to:

search for a fault generation message matching the fault restoration message, wherein the matching refers to that the two messages comprise the same lower-layer service fault identifier and the same fault type, and when the fault generation message matching the fault restoration message is found, delete the fault generation message.

* * * * *